J. COOK.
CHURN.

No. 176,218. Patented April 18, 1876.

WITNESSES:
E. Wolff.
John Goethals

INVENTOR:
Jonas Cook
BY
ATTORNEYS.

UNITED STATES PATENT OFFICE

JONAS COOK, OF MOUNT PLEASANT, NORTH CAROLINA.

IMPROVEMENT IN CHURNS.

Specification forming part of Letters Patent No. 176,218, dated April 18, 1876; application filed February 5, 1876.

*To all whom it may concern:*

Figure 1:
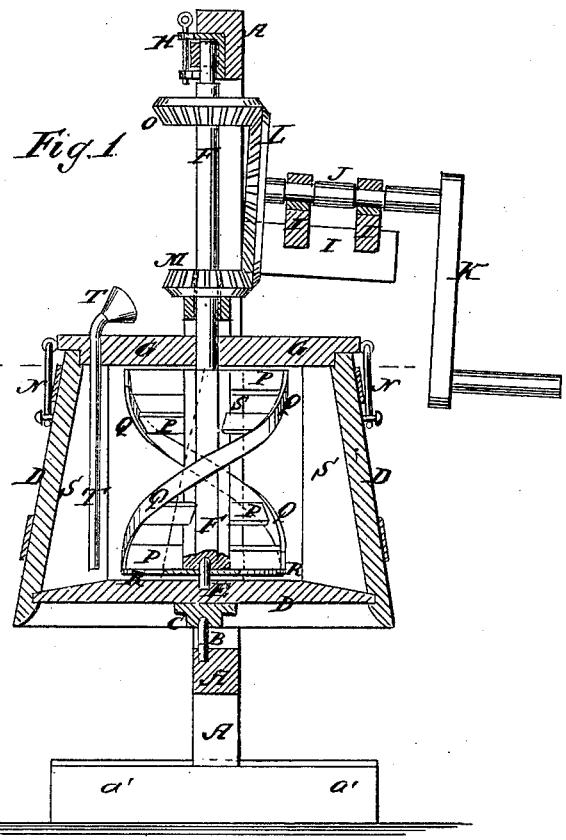
Figure 2:
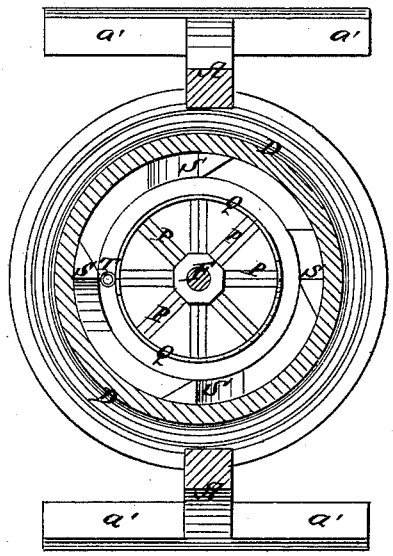

Be it known that I, JONAS COOK, of Mount Pleasant, in the county of Cabarrus and State of North Carolina, have invented a new and useful Improvement in Churning Apparatus, of which the following is a specification:

Figure 1 is a vertical section of my improved churning apparatus. Fig. 2 is a horizontal section of the same, taken through the line $x\ x$ of Fig. 1.

Similar letters of reference indicate corresponding parts.

The object of this invention is to furnish an improved churning apparatus, which shall be so constructed as to throw the milk into violent agitation, bringing the butter in a very short time, and with a comparatively small outlay of labor.

The invention will first be described in connection with drawing, and then pointed out in the claim.

A is an upright frame, the lower ends of the posts of which are attached to cross-sills $a'$ of such a length as to give a stable support to the apparatus.

To the center of the lower cross-bar of the frame A is attached a pivot, B, upon which rests a socket, C, attached to the center of the lower side of the bottom of the churn D.

To the center of the upper side of the bottom of the churn D is attached a pivot, E, upon which the lower end of the dasher-shaft F revolves. The dasher-shaft F passes up through a hole in the churn-cover G, and its upper end revolves in bearings H attached to the top cross-bar of the frame A.

The bearing H is made in two parts or halves, the outer half being hinged at one end and secured by a pin at the other end, so that it may be readily unfastened and swung out to release the upper end of the dasher-shaft F, and allow the churn D and its attachments to be removed from the frame A.

To the upper part of the frame A is attached a horizontal frame, I, in bearings attached to which revolves a shaft, J.

To the outer end of the shaft J is attached the crank K, by which the churn is operated, and to its inner end is attached a large bevel-gear wheel, L.

Into the teeth of the bevel-gear wheel L at its lower side mesh the teeth of a small bevel-gear wheel, M, rigidly attached to the cover G, or to a bracket attached to said cover, and through which the dasher-shaft F passes.

The cover G is connected with the churn-body D by hooks N or other fasteners, so that the said churn-body may be rotated by the revolution of the gear-wheel M.

Into the teeth of the gear-wheel L at its upper side mesh the teeth of a small bevel-gear wheel, O, attached to the dasher-shaft F. By this arrangement the dasher-shaft and churn-body will be revolved at the same time and in opposite directions.

The wheel M is made smaller than the wheel O, so that the churn-body may be revolved at a greater velocity than the dasher-shaft F.

To the shaft F is attached a series of cross-bars, P, extending from the bottom of the churn D to or nearly to the cover G.

The cross-bars P are arranged spirally and with their upper edges inclined forward, so as to force the milk downward and outward, except the lower one, which is inclined in the opposite direction to lift the milk from the bottom of the churn and force it upward.

To the ends of the cross-bars P are attached spiral strips Q, and to the lower end of the shaft F, and the lower edge of the lower cross-bar P, is attached a circular disk, R, of a diameter equal to the length of the cross-bars P.

To the sides of the inner surface of the churn-body D are attached upright bars or blocks S, the upper ends of which are inclined slightly forward, and their forward sides are inclined inward and rearward, so as to throw the milk inward to meet the dasher.

T is a tube of rubber, or other suitable material, which passes through a hole in the cover G, and extends down into the churn-body D.

The upper end of the pipe is curved forward, and is provided with a funnel-shaped mouth, so as, when the churn-body is revolved to catch the air and conduct it into the milk.

The tube T may be detached when not required for use.

Having thus described my invention, I claim as new and desire to secure by Letters Patent—

A churn-dasher, consisting of spiral cross-bars P, spiral disk Q, and circular disk R, the said cross-bars being inclined downwardly on the upper edges, and upwardly on the lower edges, as and for the purpose specified.

JONAS COOK.

Witnesses:
JOHN SHIMPOCH,
A. L. YOUNT.